Sept. 27, 1966        E. BEXTEN        3,275,386
CRAWLER TRACTOR SUSPENSION
Filed Aug. 4, 1964        2 Sheets-Sheet 2
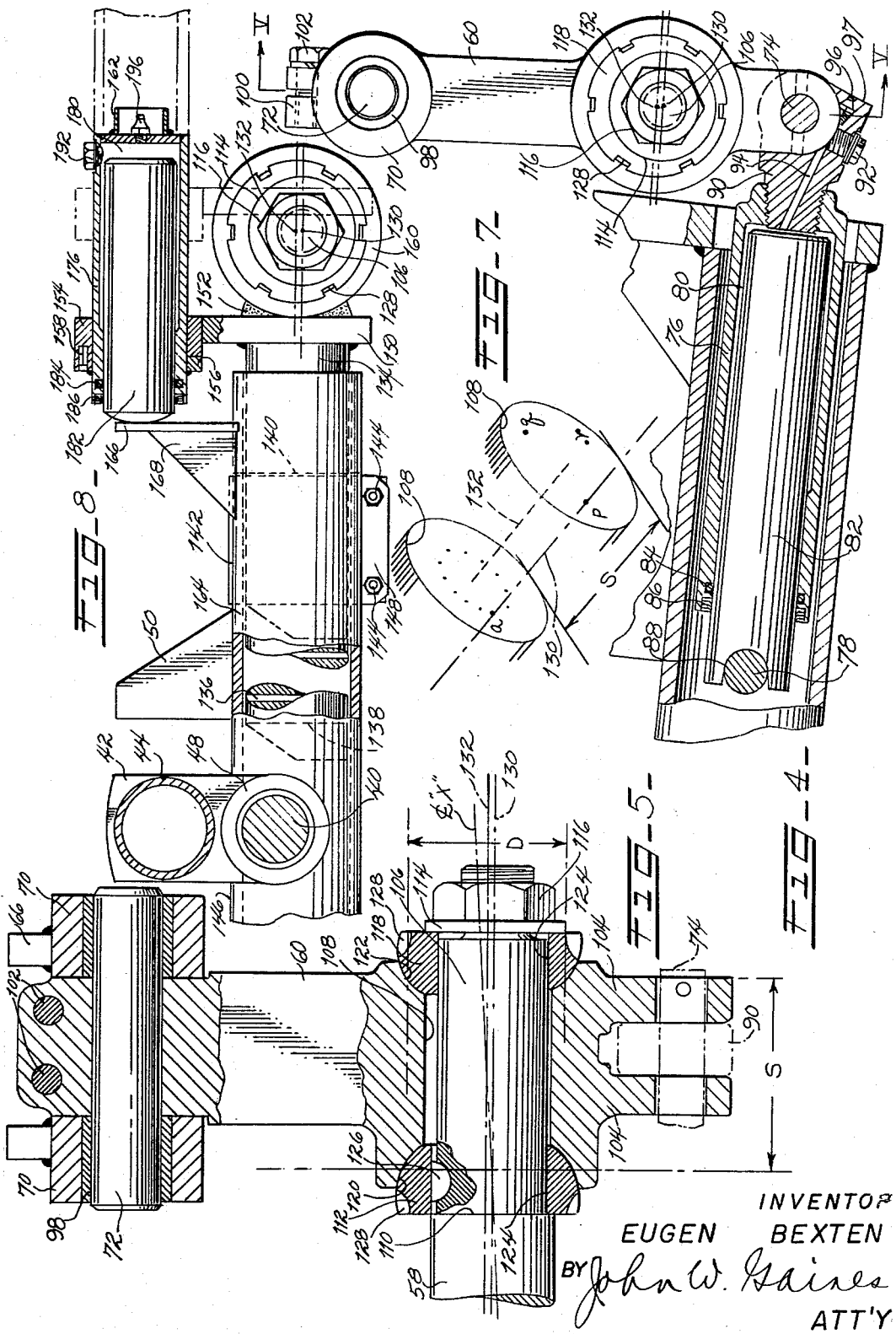
INVENTOR
EUGEN BEXTEN
BY John W. Gaines
ATT'Y

United States Patent Office 3,275,386
Patented Sept. 27, 1966

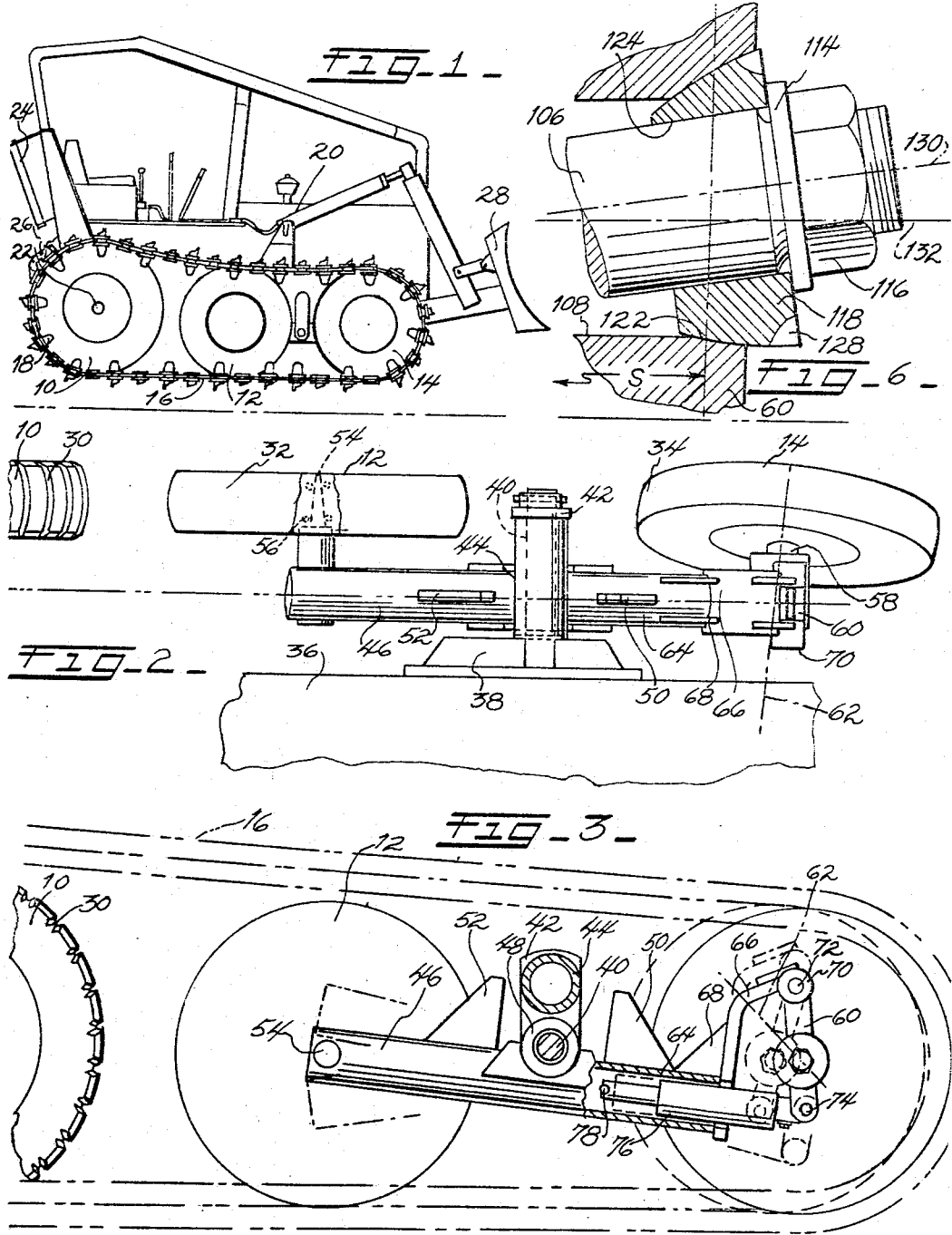

3,275,386
CRAWLER TRACTOR SUSPENSION
Eugen Bexten, Hamilton, Ontario, Canada, assignor to International Harvester Company, Chicago, Ill., a corporation of New Jersey
Filed Aug. 4, 1964, Ser. No. 387,352
9 Claims. (Cl. 305—10)

This application relates to the wheel suspension for a crawler tractor, and more particularly to a front wheel suspension therefor which oscillates in its action and which, in respect of the endless crawler track trained thereon, keeps such track running true on the wheels.

In rubber-tire-driven, crawler suspensions and especially in cases where the front suspension is mounted so as to allow the track assembly to oscillate, the front wheel is a particularly critical component in respect of controlling it to keep from throwing the track. A combination of good chain tension adjustability, and proper camber and toe-in adjustabiilty of the front wheel spindle has been found greatly to improve wheel action at the front in retaining the track thereon.

In that connection, it has been found difficult, in supporting a spindle or other cantilevered elongated member, to provide a means of securement therefor which affords a simple eccentric adjustment. It is the practice to secure an eccentric in a frusto-cylindrical counterbore and therefore, according to the practice, the eccentric of fords circular adjustment only in one plane and never out of the plane of the circle.

It is therefore an object of my invention to overcome the foregoing difficulty by providing a ball seat for each of two spaced-apart, spindle carrying eccentrics, so as to afford a universal angular adjustment not limiting the spindle to one plane of rotation of each eccentric on its seat.

Another object is to provide a simple, spaced-eccentric support for a wheel spindle or other elongated member, wherein the fixed and movable parts of the support are minimal in number and yet the movable parts are adjustable to lock the spindle and establish any angle in a desired range of angles of camber and toe-in of the wheel.

A more specific object, in line with the objective just stated, is to provide a front suspension including: a longitudinal beam disposed at one side of the vehicle parallel to the direction of running; a spindle support carried by one end of the beam; the support defining open-centered sockets aligned with and facing away from one another transversely to the direction of running; elongated spindle structure received with all-around clearance within, between, and extending beyond the sockets; means of securement for holding said structure torsionally locked within the sockets of the support; the means of securement comprising eccentrics fitting in the sockets and eccentrically supporting the structure at spaced-apart points; the interface of contact between each socket and the eccentric therein being frusto-spherical for preliminary freedom of movement of the eccentrics angularly between those planes, and in such planes, which are rotated both away from and into coincidence with the plane of each socket; and means for relatively rotating and torsionally locking the eccentrics in various final positions in the sockets to fix the wheel camber and toe-in.

A further object of my invention is to provide, in a crawler tractor front suspension, a hydraulically operated track tensioner having positive action with high thrust, being capable of ready adjustment in the field, and being of a simple rugged construction.

A more specific object, in line with the objective just stated, is to provide, in a front wheel suspension for the endless track of a vehicle: a fore-and-aft extending beam at one side of the vehicle and having an outer end; a shiftable support having a transversely extending through bore and being shiftably carried on the outer end of the beam; a wheel mounting structure provided with an end portion disposed in the bore and having means of securement for holding the end portion torsionally locked within the bore of the support; and compression means operatively behind the wheel comprising a fore-and-aft adjustable hydraulic device disposed between and connecting the beam at the outer end and the shiftable support for adjusting and locking the support to apply tension to the track.

It is another object of my invention to provide compression means as just described, wherein the hydraulic device is secured in an upwardly offset, protected relation with respect to the beam and disposed parallel thereto.

It is a further object of the invention, in accordance with a modified form thereof, to provide an arrangement of the compression means such as the foregoing, wherein the outer end of the beam is hollow, and wherein the hydraulic device is disposed with all-around clearance within the hollow outer end of the beam and is pivotally connected between the beam and the previously referred to shiftably mounted support carried by that end of the beam.

Further features, objects, and advantages will be either specifically pointed out or become apparent when, for a better understanding of my invention, reference is made to the following written description taken in conjunction with the accompanying drawings, which show a preferred embodiment thereof and in which:

FIGURE 1 is a view in right side elevation of a track-laying vehicle incorporating the present rubber-tire-driven, crawler suspension;

FIGURES 2 and 3 are top plan and inside elevational views of the left front suspension of the vehicle of FIGURE 1;

FIGURE 4 is a fragmentary view corresponding to FIGURE 3 and showing a detail thereof in cross section to an enlarged scale;

FIGURE 5 is a longitudinal vertical section taken from the rear along lines V—V of FIGURE 4;

FIGURES 6 and 7 are respective schematic views, considerably exaggerated, of one camber and toe-in eccentric and of the adjustable action of a pair of such eccentrics; and FIGURE 8 is a view corresponding to FIGURE 4, but showing a modification of the invention.

More particularly in FIGURE 1 of the drawings, a crawler vehicle, sometimes known as a skidder, is shown including, at each side of the vehicle, a track-laying suspension having three tandem wheels 10, 12 and 14 at the rear, at the center, and at the front, respectively. An endless track 16 is trained about the tandem wheels. The track 16 is made of metal links and alternate ones of these links carry inwardly directed tire guides 18 to aid in keeping the track 16 centered on the wheels.

The vehicle includes an engine 20 which is coupled by a transmission, not shown, to rotate oppositely extending axles 22 at the rear which drive the rear wheels 10. The vehicle illustrated is particularly adapted for log skidding, including at the rear a log arch 24 and a winch drum 26, and including at the front a high lift, conventionally power-operated dozer blade 28 for the piling of logs.

In FIGURES 2 and 3, the rear wheel 10 includes a pneumatic tire having transverse grooves 30 in the tread so as to interengage with drive bars, not shown, in the endless track 16 for producing positive drive. The wheels 12 and 14 likewise carry pneumatic tries and they have smooth treads 32 and 34.

The vehicle has a fore-and-aft extending frame 36 carrying at each side a front suspension bracket 38. A crosswise extending, fixed shaft 40 is secured at the inner end to each bracket 38 and at the outer end to a cantilever plate 42. The cantilever plate 42 is supported from above by a crosswise extending pipe 44 fixed at one end to the plate 42 and at the other end to the bracket 38 of the vehicle frame 36.

A bogie beam 46 which extends fore-and-aft carries a sleeve bearing 48 on the mid-portion of the beam. The bearing 48 freely receives the fixed, crosswise extending shaft 40 so that the beam has unbiased, oscillating motion. Upstanding front and rear stops 50 and 52 which are secured to the top of the beam 46 swing into engagement with the pipe 44 from opposite sides to limit the angle of oscillation of the beam 46 up and down.

In connection with a copending application of mine, Serial No. 387,300 filed August 4, 1964, the disclosure therein relating to the pivoted bogie beam and other common matter embodied in the skidder vehicle is incorporated in this application by reference.

A wheel spindle 54 which is fixed to the inner or rear end of the bogie beam 46 is received in bearings 56 carried in the hub of the center wheel 12 for rotatably mounting the wheel on the beam 46. Another spindle 58 is shiftably mounted at the front outer end of the beam 46 and rotatably carries the front wheel 14. The spindle 58 has an adjustable means of securement to a support arm 60 so as to allow the spindle to be adjusted for camber and toe-in, with its axis appearing in a greatly exaggerated position as indicated at 62.

The beam 46 has a hollow front end portion 64 carrying an upright 66 which is reinforced in its position thereon by means of welded gussets 68. A pair of spaced-apart eyes 70 carried by the upright 66 serves as the bearings receiving an upper pivot pin 72.

The support arm 60 is pivoted on the upper pin 72 so that the secured upper end of the arm swings about a fixed transverse axis which is upwardly offset from the beam 46. The free-swinging lower end portion of the support arm 60 carries a lower pivot pin 74 fixed thereto which is pivotally connected to the front end of a hydraulic cylinder 76.

In FIGURES 3 and 4, the hydraulic cylinder 76 is pivoted at its rear end to a cross pin 78 fixed within the hollow front end 64 of the beam at a point close to the midsection of the beam. The cylinder 76 has sufficient all-around clearance from the inside of the beam 64 so that when received within the hollow of the beam, the cylinder 76 can pivot a slight amount in a vertical plane without interference.

The cylinder 76 has a cylindrical chamber 80 therein which slidably receives a rod-shaped ram 82. The ram 82 projects from the mouth of the chamber 80 through a pair of seal rings 84 and 86 to a point of connection in which it receives the pin 78 in a V-notch 88 formed in the projecting end of the ram 82.

The lower pivot pin 74 is received within the eye of a combined grease-fitting and eye member 90 which is threadedly received in the front end of the cylinder 76. A fluid releasing member 92 is threaded into the end of the member 90 so as to intersect a fluid passage 94, and a one-way, zerk valve fitting 96 communicates through the passage 94 with the chamber 80 so as to introduce thereinto fluid such as hydraulic fluid, grease, or the like. A recessed end 97 of the member receives the valve fitting 96 and forms a protective shroud thereabout.

The cylinder 76 of FIGURES 3 and 4 shifts the arm 60 in a fore-and-aft direction to establish and lock the tension desired in the track 16.

In FIGURES 4 and 5, the upper pivot pin 72 is set in individual sleeve bearings 98 carried by the spaced-apart eyes 70 and, at the mid-portion, the pin 72 is tightly clamped in the forked end 100 of the support arm 60 by means of two clamping screws 102. At the bottom of the arm 60, a pair of spaced-apart brackets 104 supports the grease-fitting and eye member 90 therebetween by means of the lower pin 74, which passes through the member 90 and through registering openings in the brackets 104.

In FIGURE 5, the wheel spindle 58, which extends crosswise to the direction of running, has at the inner end a coaxial extension 106 of reduced diameter which is received in and projects through an oversize, through bore 108 formed in an intermediate portion of the free end of the arm 60. A shoulder 110 on the outer end of the reduced extension 106 engages the large end of an outer frusto-spherical eccentric 112, and a washer 114 and a nut 116 on the small threaded inner end of the extension 106 engages the large end of an inner frusto-spherical eccentric 118. Receiving ball seats are provided by forming oppositely outwardly facing sockets 120 and 122 in the mouths at opposite ends of the bore 108, the sockets being of frusto-spherical shape complementary to the eccentrics 112 and 118.

The eccentrics 112 and 118 consist of metal bushings each presenting an eccentrically located hole 124 at one end of the bore 108 and supporting therein the adjacent portion of the extension 106 at that at that end. The hole in the outer eccentric 112 is slotted with an axially extending keyway in the wall to receive a key 126 carried by the extension 106 and preventing relative rotation between the extension and the eccentric 112. Arcuately shaped tool slots 128 are formed at spaced-apart points around the periphery of the large outer end of each eccentric 118 to enable the eccentrics to be rotated on their ball seats to positions either in transverse symmetry or phase with one another or out of phase as desired.

The eccentrics 112 and 118 actually have two degrees of freedom of movement, one movement of which can be visualized in FIGURE 5 wherein the holes 124 are both in their downwardmost or highest vehicle position. The planes of the sockets 120 and 122 provide a ball-seat span S. When the eccentrics 112 and 118 are rotated the same number of degrees in a common direction, each in the plane of its receiving socket, the longitudinal center line or axis 130 of the extension 106 remains parallel to, but rotates at a uniform spaced-apart distance eccentrically about the center line or axis 132 of the bore 108. Rotation of the eccentrics to a position 180° away from the position illustrated causes the vehicle to assume the lowest adjusted position.

The ball-seat diameter D is seen in FIGURE 5 to be slightly exceeded in its dimension by the distance of the span S, but not by much. This relationship allows considerable room for changing the disposition of the extension 106 and, at the same time, the span distance S is sufficient to withstand the rather strenuous cantilever forces set up in the spindle 58 which is stressed in bending and shear and which supports a front wheel, not shown, at the free end.

In FIGURE 6, the eccentric 118 as shown is arranged with the plane of the bushing angled to the plane of the ball seat, to illustrate the other degree of freedom possessed by the eccentrics. In other words, the angled reference plane of the bushing is one of an infinite number of non vertical, reference planes both into which the bushing can be rotated on its ball seat, and in which the bushing can then be rotated on its ball seat once the bushing occupies such non vertical reference plane.

The eccentrics are adjusted on their seats so that the wheel spindle axis 130 of FIGURE 7 takes the desired angularity for camber and toe-in corresponding to the axis 62 of FIGURES 2 and 3 preceding. More specifically in FIGURE 7, from an eccentric point $p$ relative to the bore axis 132, the axis 130 of the spindle extension can be made to intersect any point in a ring of points beginning with point $a$. Similarly, from any point in that ring of points including the point $a$, the axis 130 can be made to pass through the points $q$ and $r$ in the same circle with point p. In a special case, but not generally, the axis 130 precisely intersects the bore axis 132, in which case it bisects the bore axis and maximum angularity is obtained between the axis 130 and the wall of the bore 108.

In FIGURE 8, a compression means of modified form is illustrated, for use behind the wheel, not shown, for applying tension to the track. However, the fixed cross shaft 40 is the same as previously disclosed, including the beam bearing 48, the pipe 44, the cantilever plate 42, and the upstanding stop 50. Similarly, the means of securement for, and the relation of spindle extension 106 are the same, including the two axes 130 and 132, the total slots 128, the retaining nut 116, and the washer 114.

A bogie beam 146 which oscillates about the fixed shaft 40 has a hollow main section 164 at the front telescopically receiving a front end rod section 134. The rod section 134 is formed with a longitudinal vertical slot 136 having one end 138 adjacent the diagonally cut-off inner end of the rod section 134 and the other end 140 adjacent the outer end of the rod section 134. A fixed, generally rectangular key plate 142 fits in the slot 136 and is secured at the bottom by bolts 144 to an attachment lug 148 welded to the underside of the main section 164 of the beam. The rod section 134 of the beam is thus guided non-rotatably fore-and-aft and carries an upstanding plate 150 welded thereto at the front end. A weld 152 secures a cylindrical wheel spindle support 160 to the front side of the plate 150.

At the upper end, the plate 150 has welded thereto a collar 154 which receives a hydraulic cylinder 176. A stop ring 156 which is welded about the cylinder 176 abuts the collar 154 and has a pin connection 158 holding it non-rotatable with respect to the collar. The cylinder 176 is readily removed by withdrawing it from the collar 154 when the rod section 134 of the beam is moved rightwardly as viewed in FIGURE 8.

A working chamber 180 within the cylinder 176 has a threaded drain plug 192 and a one-way zerk valve fitting 196 in communication therewith. The drain plug 192 when loosened in its threads allows air to be bled off during filling of the chamber with fluid, and also allows the fluid to be displaced and discharged from the chamber 180 when a ram 182 is retracted therein. The zerk valve fitting 196 is centered within a cylindrical protective shroud 162 which surrounds and projects beyond the valve 196.

The ram 182 has an end passing through two ring seals 184 and 186 in the mouth of the cylinder 176 and projecting into engagement with a plate 166 carried in a transverse disposition on the main section of the beam 146. The plate 166 is reinforced by a gusset 168 which is secured to the beam 146.

The rams 82 and 182 of the respective FIGURES 4 and 8 are hydraulically locked in an extended position due to the closed, one-way zerk valve fittings 96 and 196, respectively. Additional tension can be applied to the track by means of a hydraulic gun or a grease gun applied so as to inject fluid into the fittings and thereby hydraulically extend the rams 82 and 182, respectively. The cylinder 76 as illustrated has a generally concentric relationship to the beam, whereas the cylinder 176 is upwardly offset from the beam, being both parallel to the beam and in the plane thereof.

Following is an example of the specifications of the vehicle:

Diameter of pneumatic-tired rear wheel 10__inches__ 34
Diameter of rubber-tired center and front
  wheels 12 and 14 _____do____ 28
Span-to-diameter ratio S/D, preferably in range
  between _____ 2:1 and 1:1__ 1.2:1
Eccentricity (FIGURE 5) as desired, e.g. __inches__ 3/16
Angularity (FIGURE 6) _____ 0° to 3°
Length of each track on ground _____inches__ 76
Track gauge _____do____ 52

As herein disclosed, the invention is shown embodied in an oscillating beam-type of front suspension employing smooth-treaded pneumatic tires, affording a cushioned ride for operator comfort and longer life of the tractor components. It is evident that slick or grip-treaded semi-pneumatic or solid rubber tires can also be employed, but the ride will be harsher.

Variations within the spirit and scope of the invention described are equally comprehended by the foregoing description.

What is claimed is:
1. Front suspension mechanism for the endless track of a vehicle including:
 a longitudinally extending beam at a side of the vehicle having outer and inner ends;
 a laterally extending shaft connecting the vehicle and the beam together at a point intermediate the ends of the beam so as to establish a fixed axis of oscillation of the beam;
 a spindle support having a through bore and carried by the outer end of the beam;
 a wheel mounting spindle including a spindle extension in said bore having means of securement holding said extension torsionally locked within the bore of the spindle support;
 said means of securement comprising two outwardly facing, frusto-spherically shaped sockets formed one in each of the opposite ends of the bore;
 two bushings disposed one at each end of the bore and received in and having a complementary frusto-spherical shape to the socket at that end;
 the bushing at each end of the bore having an eccentrically located hole receiving the adjacent portion of the spindle extension at that end, the adjacent portion of the spindle extension in one of said bushings being rotatably fast to that bushing; and
 tool receiving fitting means on said bushings for relatively rotating and locking the bushings in various positions in the ends of said bore to adjust for angles of camber and toe-in of the wheel;
 the interface of frusto-spherical contact between the bushings and sockets in the bore having a span-to-diameter ratio of approximately 1.17:1.

2. Wheel suspension mechanism for the endless track of a vehicle including:
 a longitudinally extending beam at a side of the vehicle;
 a spindle support having a through bore and carried by one end of the beam;
 a wheel mounting spindle including a spindle extension and having means of securement for the spindle holding the extension thereof torsionally locked within the bore of the spindle support;
 said means of securement comprising two outwardly facing, frusto-spherical shaped sockets formed one in the mouth of each of the opposite ends of the bore;
 two bushings disposed one at each end of the bore and received in and having a complementary frusto-spherical shape to the socket at that end;
 the bushing at each end of the bore having an eccentric hole receiving the adjacent portion of the spindle extension at that end, the adjacent portion of the spindle extension in one of said bushings being held rotatably fast to that bushing; and
 means for relatively rotating and locking the bushings in various positions in the mouths of said bore to adjust for angles of camber and toe-in of the wheel;
 the interface of frusto-spherical contact between the bushings and sockets at the mouths of the bore having a span-to-diameter ratio between approximately 2:1 and 1:1.

3. In the front suspension of a track laying vehicle:
 support means operatively connected to the vehicle at a side and having an outwardly directed opening;

a spindle disposed in a horizontal position transversely to the direction of running, and having means of securement in the opening in the support means;

said means of securement comprising spaced-apart eccentrics carried by the spindle and socketed to turn in oppositely outwardly facing ball seats integral with the support means; and a set of engageable means on the outer end of each eccentric providing for forcible relative rotation between the eccentrics;

the interface of contact between each ball seat and the eccentric socketed therein affording freedom of turning movement of the eccentrics angularly between those planes, and angularly in such planes, which are rotated both away from and into coincidence with the planes of the respective seats in which the eccentrics turn.

4. In the front suspension of a track laying vehicle:

support means operatively connected to the vehicle at a side, and defining open-centered sockets aligned with and facing away from one another transversely to the direction of running;

a spindle member passing with all-around clearance through, and laterally past said sockets;

means of securement comprising eccentrics fitting in said sockets so as to eccentrically support the spindle member at spaced-apart points;

a set of tool receiving fitting means on the outer end of each eccentric for engagement with a tool to cause relative rotation between the eccentrics; and key means between one eccentric and the adjacent point of support on the spindle member supported thereby;

the interface of contact between each socket and the eccentric therein being frusto-spherical for freedom of movement of the eccentrics angularly between those planes, and in such planes, which are rotated both away from and into coincidence with the plane of each socket.

5. In the front suspension of a vehicle:

support means operatively connected to the vehicle at a side, and defining open-centered sockets aligned with and facing away from one another transversely to the direction of running;

a spindle member passing with all-around clearance through, and past said sockets; and means of securement comprising eccentrics fitting in said sockets and eccentrically supporting the spindle member at spaced-apart points;

the interface of contact between each socket and the eccentric therein being frusto-spherical for preliminary freedom of movement of that eccentric angularly between those planes, and in such planes, which are rotated both away from and into coincidence with the plane of each socket;

said interfaces of contact having a span-to-diameter ratio of approximately between 2:1 and 1:1.

6. In a suspension for a track laying vehicle:

support means operatively connected with the vehicle at a side and defining spaced-apart open-centered sockets aligned with the facing away from one another in a direction transverse to the direction of running;

an elongated shaft member received in, and passing with all-around clearance through, and past said sockets;

means of securement comprising two bushings received one in each socket, each bushing and its receiving socket having complementary frusto-spherical contact with one another;

each portion of the elongated member adjacent a bushing being received in an eccentrically located hole formed in that bushing for preliminary movement of the member in shifting of its axis and in rotating about its axis; and tool receiving fitting means for relatively rotating the bushings and additional means for locking the bushings in various final positions which are between those planes, and in such planes, which are angled out of and into coincidence with the plane of the receiving socket for each bushing.

7. Front wheel suspension mechanism for the endless track of a steered-by-driving vehicle including:

longitudinally extending main beam structure operatively carried at one side of the vehicle;

spindle support structure mounted for movement on the outer end of the beam and having a through bore;

a wheel mounting spindle including a spindle extension in the bore having means of securement for holding the extension torsionally locked within the bore of the spindle support structure;

said longitudinally extending main beam structure and spindle support structure including therebetween compression means operatively behind the wheel, comprising a hydraulic cylinder having its axis at least substantially parallel to the main beam structure and connected between said structures for adjusting the spindle support structure fore and aft at the outer end of the main beam structure to apply tension to the track;

said means of securement comprising spaced apart eccentrics having frusto-spherical surfaces, said eccentrics being carried by the extension and socketed in outwardly facing ball seats formed in the bore at the opposite ends thereof; and a set of tool receiving, fitting means carried by the outer end of each eccentric and engageable to provide for forcible relative rotation between the eccentrics and the ball seats;

the interface of contact between each ball seat and the eccentric socketed therein affording freedom of turning movement of the eccentrics whereby the spindle extension takes an adjusted angle to the alignment axis of the ball seats.

8. The invention of claim 7, characterized by:

said outer end of the beam structure being hollow, said compression means being disposed therewithin and pivotally connected between the hollow end of the beam structure and the spindle support structure, and being of smaller diameter than the transverse inside dimensions of said end to provide all around side clearance to the compression means in accommodating to pivotal action of the compression means in adjusting said support structure fore and aft.

9. The invention of claim 7, characterized by:

said compression means being disposed in a transversely offset location on the outer end of said beam structure, for connection between said structures as aforesaid.

References Cited by the Examiner

UNITED STATES PATENTS

| | | | |
|---|---|---|---|
| 774,042 | 11/1904 | Cooper | 280—96.21 |
| 1,689,750 | 10/1928 | Redfield. | |
| 2,423,544 | 7/1947 | Acton | 305—29 |
| 2,654,639 | 10/1953 | Bombardier | 305—10 |
| 2,838,343 | 6/1958 | Jenkins | 305—10 |
| 2,891,821 | 6/1959 | Mayr | 305—32 X |
| 3,142,352 | 7/1964 | Johansson | 305—29 |
| 3,190,384 | 6/1965 | Dufresne | 180—9.5 X |

BENJAMIN HERSH, *Primary Examiner.*

R. J. JOHNSON, *Assistant Examiner.*